US007350143B2

(12) United States Patent
Elazar et al.

(10) Patent No.: US 7,350,143 B2
(45) Date of Patent: Mar. 25, 2008

(54) METHOD FOR PAGE TRANSLATION

(75) Inventors: Gidon Elazar, Tsur-Yigal (IL); Dan Harkabi, Moshav Lachish (IL); Nehemiah Weingarten, Tel-Aviv (IL)

(73) Assignee: SanDisk Corporation, Milpitas, CA (US)

( * ) Notice: Subject to any disclaimer, the term of this patent is extended or adjusted under 35 U.S.C. 154(b) by 202 days.

(21) Appl. No.: 10/955,506

(22) Filed: Oct. 1, 2004

(65) Prior Publication Data

US 2005/0138551 A1   Jun. 23, 2005

Related U.S. Application Data

(60) Provisional application No. 60/508,372, filed on Oct. 3, 2003.

(51) Int. Cl.
*G06F 17/00* (2006.01)
(52) U.S. Cl. ........................ 715/525; 715/523
(58) Field of Classification Search ............ 715/525, 715/517, 523
See application file for complete search history.

(56) References Cited

U.S. PATENT DOCUMENTS

| | | | | |
|---|---|---|---|---|
| 5,068,808 A | * | 11/1991 | Wake | 345/419 |
| 5,216,602 A | * | 6/1993 | Wolfkiel et al. | 600/407 |
| 5,283,864 A | * | 2/1994 | Knowlton | 715/776 |
| 5,408,654 A | * | 4/1995 | Barry | 707/101 |
| 5,642,473 A | * | 6/1997 | Klotz, Jr. | 358/1.18 |
| 5,890,173 A | * | 3/1999 | Yoda | 715/501.1 |
| 6,018,749 A | * | 1/2000 | Rivette et al. | 715/525 |
| 6,055,530 A | * | 4/2000 | Sato | 707/3 |
| 6,128,633 A | * | 10/2000 | Michelman et al. | 715/525 |
| 6,175,845 B1 | * | 1/2001 | Smith et al. | 715/525 |
| 6,487,567 B1 | * | 11/2002 | Michelman et al. | 715/525 |
| 6,789,229 B1 | | 9/2004 | Dunietz et al. | |
| 6,832,352 B1 | * | 12/2004 | Dooley | 715/525 |
| 7,171,310 B2 | * | 1/2007 | Haugland | 702/7 |
| 2001/0014229 A1 | * | 8/2001 | Nakata et al. | 399/82 |
| 2002/0016678 A1 | * | 2/2002 | Haugland | 702/7 |
| 2002/0067499 A1 | * | 6/2002 | Sakamoto et al. | 358/1.14 |
| 2003/0056177 A1 | * | 3/2003 | Nara et al. | 715/525 |
| 2004/0019854 A1 | * | 1/2004 | Nguyen et al. | 715/525 |
| 2004/0024743 A1 | * | 2/2004 | Kato | 707/1 |
| 2004/0105127 A1 | * | 6/2004 | Cudd et al. | 358/1.18 |
| 2004/0119998 A1 | * | 6/2004 | Xiong | 358/1.13 |
| 2004/0205568 A1 | * | 10/2004 | Breuel et al. | 715/513 |
| 2004/0205623 A1 | * | 10/2004 | Weil et al. | 715/525 |
| 2005/0055635 A1 | * | 3/2005 | Bargeron et al. | 715/525 |
| 2006/0120522 A1 | * | 6/2006 | Clark et al. | 380/201 |

OTHER PUBLICATIONS

Internet Explorer, Screenshots (c) 2001.*
Goland et al., "Extensions for Distributed Authoring on the World Wide Web—WebDAV, Internet Draft," Feb. 1999, http://www.ietf.org/rfc/rfc2518.txt as printed by Internet Explorer.*
Microsoft, Microsoft reader, http://www.microsoft.com/reader/default.mspx, 3 pages.
Adobe, Adobe Acrobat eBook Reader, http://www.adobe.com/products/ebookreader/index.html, 1 page.

* cited by examiner

*Primary Examiner*—Stephen Hong
*Assistant Examiner*—Adam M Queler
(74) *Attorney, Agent, or Firm*—Davis Wright Tremaine LLP

(57) ABSTRACT

Various embodiments include a means for simultaneously displaying in an ebook both an ebook page number and its corresponding print version page number.

20 Claims, 3 Drawing Sheets

METHOD FOR PAGE TRANSLATION

CROSS-REFERENCE TO RELATED APPLICATION

This application claims the benefit of U.S. Provisional Application No. 60/508,372 filed on Oct. 3, 2003, entitled "Method for Page Translation", which application is hereby incorporated herein by reference.

FIELD OF THE INVENTION

The present invention relates to electronic books and more particularly, the correlation between the page numbers in a print book and the page number in a digital version of the print book.

BACKGROUND OF THE INVENTION

An electronic book (hereafter ebook) is an electronic version of a traditional print book that can be read by using a personal computer, personal digital assistant, dedicated reading device, or any other digital appliance with a presentation means. A presentation means can be for example a viewing screen. An ebook reader is generally a digital appliance on which an ebook may be read. An ebook application is a software program executed on a digital appliance that is used for reading an ebook. Examples are Microsoft Reader (www.microsoft.com/reader/default.asp) and Adobe ebook reader (www.adobe.com/products/ebookreader/main.html).

An ebook application user interface is usually comprised of an application window divided into a text area and a functional area. The text area presents the content of the book, and the functional area provides control over the presentation such as buttons for next and previous page.

Although prophesied by some as a replacement for print books, market penetration of ebooks is still relatively low. One reason for this is that traditional print books offer a superior user experience for most people today.

A different approach is not to replace print books, but rather supplement them with digital versions to create an improved user experience. An example of an opportunity for improved user experience is the usage of ebooks in conjunction with print books is in the realm of education and textbooks. An example is the use of a printed history textbook for reading a chapter on the civil war, but then utilizing the ebook version of the same history book for a search function used to find all the information in the book pertaining to the Gettysburg address.

In many cases, ebooks are presented on a digital appliance differently than in print. An example is a print page of 35 lines, each containing around 12-15 words, which displays approximately 500 words. The contents of such a print page may not fit in well on a PC screen due to screen resolution, or a PDA screen due to screen size. As a result, pages in ebooks are usually re-flowed. Re-flowing a page means displaying the amount of information based on screen size, application window size, and font size. For the above print page, a re-flowed page may display only 300 words, or 27 lines of 10-12 words. In the example above, a 100 page print book becomes a 170 page ebook. It is clear to see that the original print page numbers and the digital version page numbers are different.

In order to read and or study effectively using both a print version and a digital version of a book, a user should be able to adroitly switch context between the two formats. For example, after reading several pages in the ebook, the user should easily be able to see what the relevant print page number is for continued reading on the print book. Unfortunately, existing art ebook displays only ebook pagination, disregarding the page numbers of the original print book.

There is clearly an unmet need for a translation of page numbers in an electronic book so that a user reading a print book and a digital version of the print book may easily switch between reading the print version and the digital version of the book.

SUMMARY OF THE INVENTION

The above-mentioned problem is addressed by the present invention, which will be understood by reading the following specification. In a preferred embodiment, both ebook page number and print book page number are displayed simultaneously in the text area of an ebook application. User may use a translation function to enter print page number and have the ebook reader jump to and display the corresponding ebook page. User may use a translation function to enter ebook page number and receive the corresponding print page number. A page translation table is attached to an ebook as part of the ebook metadata.

BRIEF DESCRIPTION OF THE DRAWINGS

The foregoing and other objects, aspects, and advantages will be better understood from the following description of an embodiment of the invention with reference to the drawings, wherein.

DESCRIPTION OF THE INVENTION

In the following description of exemplary embodiments of the invention, reference is made to the drawings that illustrate specific exemplary embodiments in which the invention may be practiced. Those skilled in the art will appreciate that other embodiments may be utilized without departing from the spirit of the present invention; therefore the following detailed description of the invention should not be taken in a limiting sense. In various embodiments, there may be none, one, or more than one of the following described parts.

Figure 1:
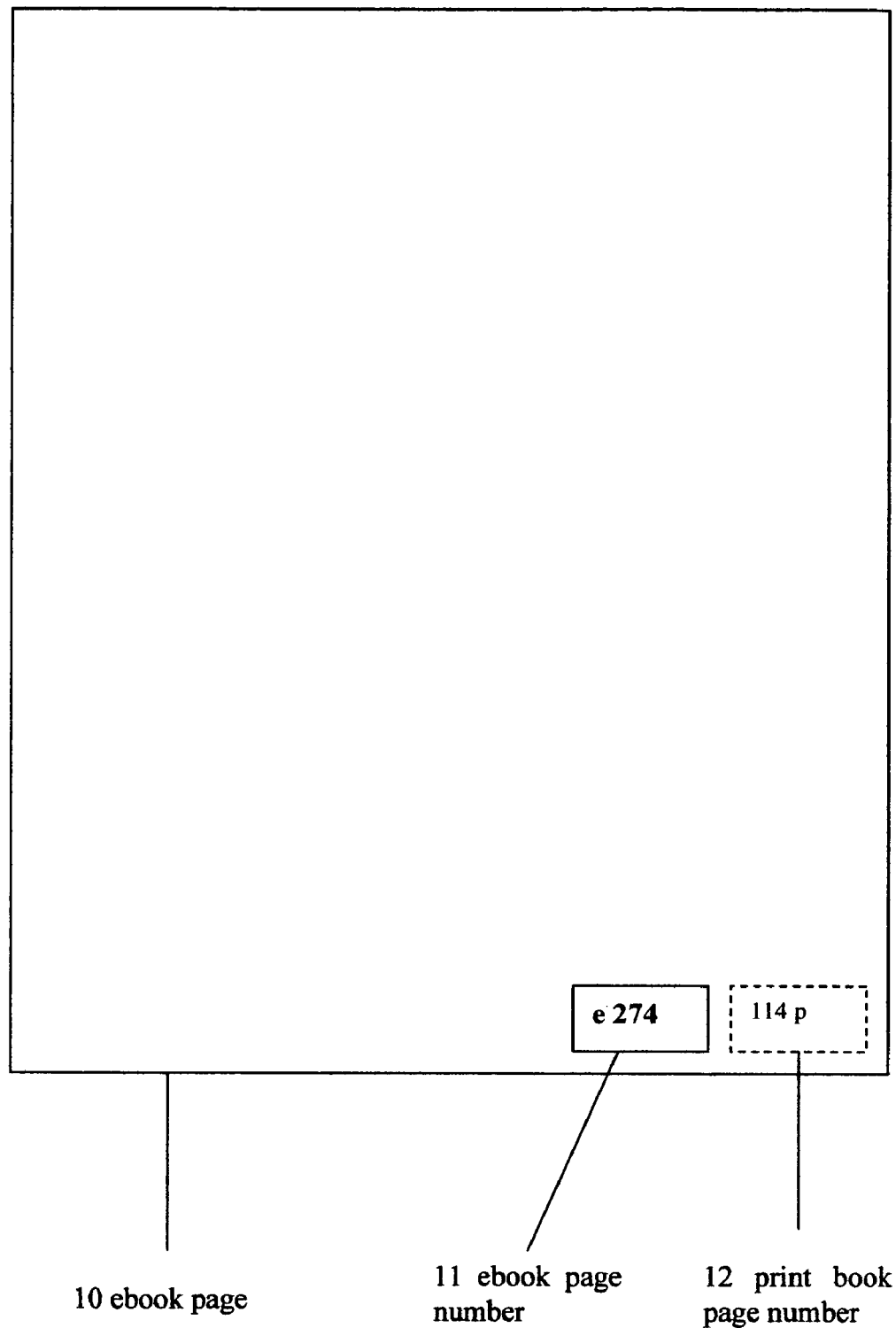
FIG. 1 is a schematic block diagram of an ebook reading application wherein both print book and ebook page numbers are displayed

FIG. 1 is an exemplary embodiment of this invention in which both ebook page number and corresponding print book page number are displayed simultaneously. An ebook page 10 is presented for reading, and on the bottom part of ebook page 10, the page numbers are displayed. Ebook page number 11 is displayed in a large and bold font, preceded by the letter e for ebook, and surrounded by a solid rectangular perimeter. Corresponding print page number 12 is displayed in a small font, followed by the letter p for print, and surrounded by a dashed perimeter.

Figure 2:
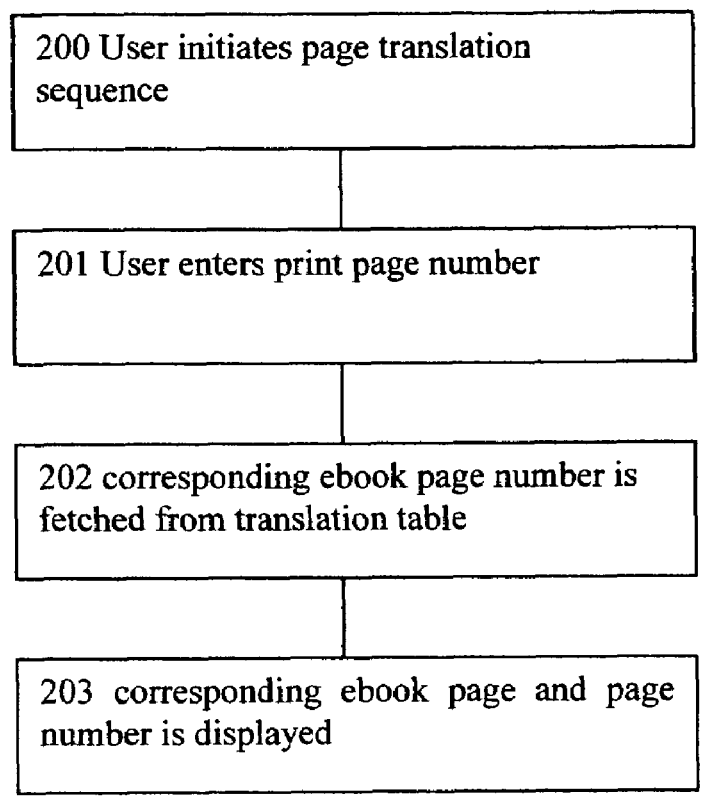
FIG. 2 is a schematic flow chart of a routine for translating from print book page number to an ebook page number.

FIG. 2 is a schematic flow chart of a routine for translating from print book page number to an ebook page number. In step 200, user initiates a page translation sequence. Initiation may be by pressing a certain key on the keyboard, clicking an application button with a mouse, voice activated, or any other method, this invention is not so limited. In step 201, user enters the print page number. In step 202 the ebook application uses a pre-prepared page translation table to fetch the corresponding ebook page number. In step 203 the ebook application displays the corresponding ebook page and ebook page number. In some embodiments, the ebook application displays only the corresponding ebook page number, this invention is not so limited.

Figure 3:
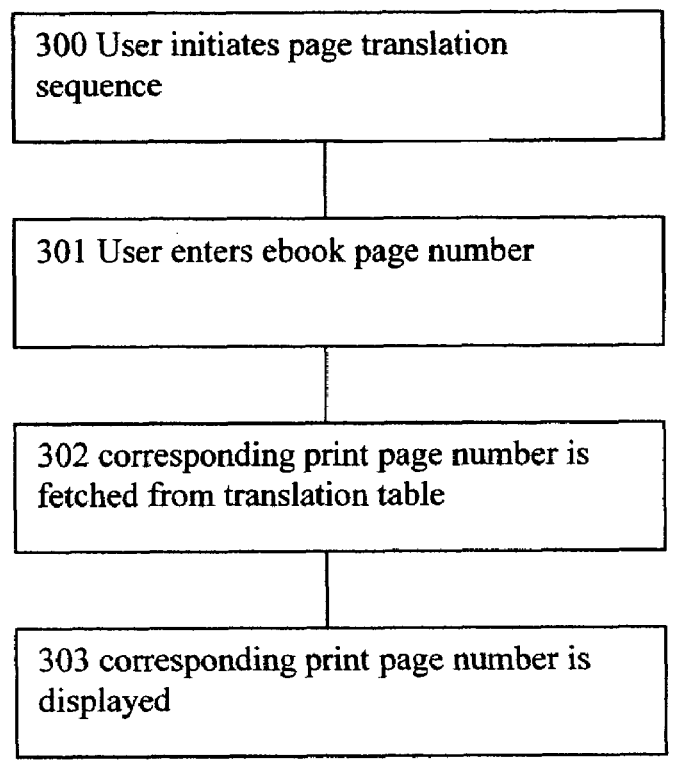
FIG. 3 is a schematic flow chart of an exemplary routine for translating from ebook page number to print book page number.

FIG. 3 is a schematic flow chart of an exemplary routine for translating from an ebook page number to print page number. In step 300, user initiates a page translation sequence. Initiation may be by pressing a certain key on the keyboard, clicking an application button with a mouse, voice activated, or any other method, this invention is not so limited. In step 301, user enters the ebook page number. In step 302 the ebook application uses a pre-prepared page translation table to fetch the corresponding print page number. In step 303 the ebook application displays the corresponding print page number.

Although the present invention has been described with reference to particular embodiments, it is not to be construed as being limited thereto. Various alterations and modifications can be made to the embodiments without in any way departing from the scope or spirit of the present invention.

We claim:

1. A method for translating page numbers, comprising the steps of:
   providing pagination information of a first paginated document;
   providing a second paginated document, comprising content of said first paginated document in a reflowed layout;
   providing a page translation means including a pre-prepared translation table of information of the pagination of said first document and the corresponding pagination of said second document;
   making reference to the translation table for corresponding pagination information, and
   presenting said second paginated document with pagination information of both the first and second documents.

2. The method of claim 1, wherein first paginated document is a book.

3. The method of claim 2, wherein said book is a textbook.

4. The method of claim 1, wherein said second paginated document is presented on a computer screen.

5. The method of claim 1, wherein said second paginated document is presented on a PDA.

6. The method of claim 1, wherein said second paginated document is presented on a smart phone.

7. The method of claim 1, wherein said second paginated document is presented on an ebook reading device.

8. The method of claim 1, wherein presenting said second paginated document includes simultaneously presenting the pagination information of both the first and second documents in a common visual format independent of the presentation of the second paginated document.

9. The method of claim 1, wherein presenting said second paginated document includes simultaneously presenting the pagination information of both of the first and second documents adjacent each other in the second paginated document.

10. The method of claim 1, wherein providing pagination information of the first paginated document includes a user requesting a portion of the first paginated document to be presented.

11. The method of claim 10, wherein the request made by the user for display of a portion of the first paginated document includes the user inputting one of the digital page numbers to the digital appliance, and wherein making reference to the translation table includes accessing said translation table with the inputted digital page number.

12. The method of claim 10, wherein the request made by the user for display of a portion of the first paginated document includes inputting one of the print page numbers to the digital appliance, and wherein making reference to the translation table includes accessing said translation table with the inputted print page number.

13. A method of displaying, on a viewing screen of a digital appliance, a document having print page numbers, comprising:
   providing, in the digital appliance, data of the document for presentation of digital pages thereof on the viewing screen,
   providing, in the digital appliance, data of a pre-prepared translation table of corresponding digital page numbers and print page numbers of the document,
   in response to a request made by a user to the digital appliance for display of a portion of the document, accessing data within the digital appliance of the requested portion of the document,
   accessing data of the translation table to determine corresponding numbers of digital and print pages for the requested portion of the document, and
   simultaneously presenting a digital page of the requested portion of the document on the viewing screen of the digital appliance along with both of the corresponding digital and print page numbers as determined from the translation table for the presented document digital page.

14. The method of claim 13, wherein the presentation on the viewing screen includes presenting both the digital page number and the print page number adjacent each other but in a manner visually distinct from each other.

15. The method of claim 14, wherein the presentation of both the digital page number and the print page number in a manner visually distinct from each other includes at least presenting a different letter adjacent each of the digital page number and the print page number.

16. The method of claim 13, wherein presenting the digital page and the page numbers includes presenting the digital page number and the print page number in a common visual format independent of the particular digital page being presented.

17. The method of claim 16, wherein the document is a published book.

18. The method of claim 13, wherein the data of the translation table are included as part of the data of the document.

19. The method of claim 13, wherein the request made by the user for display of a portion of the document includes the user inputting one of the digital page numbers to the digital appliance, and wherein accessing data of the translation table includes accessing said translation table data with the inputted digital page number.

20. The method of claim 13, wherein the request made by the user for display of a portion of the document includes inputting one of the print page numbers to the digital appliance, and wherein accessing data of the translation table includes accessing said translation table data with the inputted print page number.

* * * * *